July 31, 1962 D. EIGEN 3,047,800
CORONA-TESTING OF THE INSULATION OF ELECTRIC CABLES
Filed Nov. 25, 1957
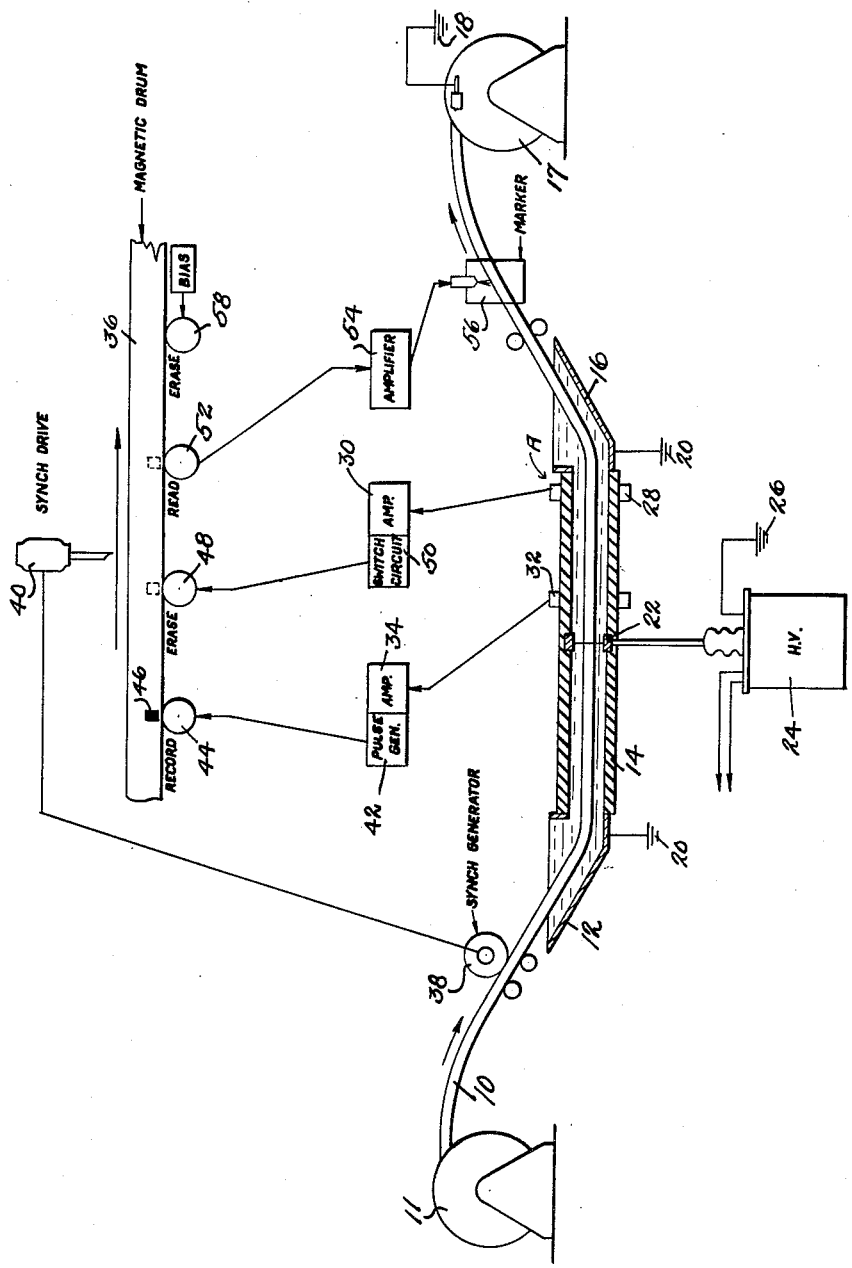
INVENTOR.
DAVID EIGEN
BY *James G. Beehler*
ATTORNEY:

United States Patent Office 3,047,800
Patented July 31, 1962

3,047,800
CORONA-TESTING OF THE INSULATION OF ELECTRIC CABLES
David Eigen, Passaic, N.J., assignor to The Okonite Company, Passaic, N.J., a corporation of New Jersey
Filed Nov. 25, 1957, Ser. No. 698,417
9 Claims. (Cl. 324—54)

My invention relates to the testing of insulated electric cables with particular reference to the detection of voids in the insulation or inclusion of ionizable gases.

When an electric cable is put in service, any gas occluded in the insulation may ionize, and corona occurs. Since corona is essentially a dissipation of energy, it can be said, in general, to have a deleterious effect upon the surrounding insulation.

Inasmuch as many factors determine whether or not a particular occlusion will ionize when the cable is put in service, attempts have been made to test the cable empirically, in order to obtain a fair indication of the voltage which may be applied to the cable with the expectation that the cable will have a satisfactory service life.

It has been suggested that the insulation of a reel of cable be subjected to electric stress similar to and somewhat higher than that to which it is subjected in service, i.e., a service-frequency alternating-current voltage between the cable conductor and the surface of its insulation. For example, the reel of cable can be submerged in water and an alternating-current voltage impressed between the cable conductor and an electrode immersed in the water. If corona occurs, it will manifest itself by generation of random-frequency oscillations detectable, for example, with an amplitude-modulated radio receiver, suitably connected to the cable conductor.

Francis H. Gooding Patent No. 2,794,168 of May 28, 1957, discloses another form of apparatus for the corona testing of insulated electric cables wherein the cable insulation is progressively subjected to stress by passing the cable, with its conductor grounded, through a tube of insulating material, grounded at each end, the tube containing a semi-conducting fluid, such as water. Intermediate its ends the tube of insulation is provided with a conducting section or electrode, which is connected to a source of high voltage. As the cable passes through this equipment, its insulation will be stressed at a maximum at the electrode and not at all at the grounded ends of the tube, and stress will be proportional on either side of the electrode. As an occlusion travels from one grounded end of the tube toward the electrode, it is stressed at progressively higher voltages, and the gas therein may ionize. The value of the ionization voltage may be obtained by moving the cable back and forth while varying the applied voltage to determine the voltage at which ionization occurs and corona is initiated and extinguished. However, whether or not an occlusion will ionize depends, for example, upon whether or not it has recently been ionized. It has been found that, almost regardless of how high the voltage at the center electrode is above the ionization initiation voltage, there is so much attenuation of the signal that it is impossible to obtain a signal unless the occlusion is within a few inches of the electrode, for example, three to five inches. In other words, it has been found that corona may be present in the cable at some point remote from the center electrode, and yet no signal will be picked up.

The present invention provides a pick-up such that the initiation and extinction voltages may be obtained without the time-consuming reversal of the cable travel and without changing the applied voltage.

Another difficulty in locating deleterious occlusions is the occurrence of interference in the vicinity of the test room. For example, the presence of arcing commutators, switching mechanisms, and other electrical equipment in the vicinity of the testing equipment will produce in the corona-detecting equipment the same sort of response as does corona, so that it is difficult to differentiate between a corona signal and interference.

In view of the foregoing, it is a primary object of my invention to produce apparatus for testing cable insulation which will evaluate a particular occlusion as to tendency to ionize under given conditions.

It is a further object of my invention to provide means for detecting corona in an insulated cable undergoing test which is less responsive to interference phenomena than equipment at present in use.

The accompanying drawing shows diagrammatically an apparatus for carrying out my invention.

Referring to the drawing in detail, 10 designates the cable to be tested, and this cable is subjected to alternating-current, service-frequency high voltage while being continuously advanced from let-off reel 11 through tank 12, tube 14 of insulating material, and tank 16 to take-up reel 17. The conductor of the cable is grounded, as shown at 18, and the tanks 12 and 16 are grounded at 20. The tanks 12 and 16 and the tube 14 contain a semi-conducting fluid, such as distilled water, for example.

Within the tube 14 is an electrode 22, which may take any desired form, such as a ring, for example, connected to one terminal of a transformer 24, the other terminal of the transformer being grounded, as shown at 26. The transformer 24 serves as the high-voltage source progressively to stress the insulation of the cable 10 as the cable is advanced.

As the cable 10 is advanced from the let-off reel 11 and wound upon the take-up reel 17, an occlusion will have its walls electrically stressed, the stress rising from zero at the end of tank 12 until it reaches a maximum at the point where the occlusion is within the electrode 22. At some point in the travel of the occlusion from tank 12 to the electrode 22, corona will occur in the occlusion if the voltage delivered by the transformer is sufficiently high and will continue until the occlusion has passed far enough beyond the electrode for the stress on the walls of the occlusion to have dropped to corona-extinction value. If corona is not indicated when the occlusion reaches the point A in the tube, then the testing apparatus will react as if no corona had been formed. The location of the point A, it will be understood, corresponds to the corona level prescribed by the specification of the cable being tested. If, however, corona is present when the occlusion reaches point A, it will be detected by a pick-up ring 28, which is provided around the tube 14 at point A. An amplifier 30, connected to the pick-up ring 28, amplifies the disturbance emanating from the corona, which is discharged at high random frequency.

To separate an indication of corona from spurious responses from interference, due to operations in a plant where the tests are being run, for example, I have provided an apparatus, illustrated in the accompanying drawing, whereby the cable is tested twice during one pass. Intermediate the electrode 22 and pick-up ring 28, I provide a pick-up ring 32. This pick-up ring 32 is connected to an amplifier 34 and arranged to indicate when corona exists in an occlusion passing that ring. It then remains to wait until the occlusion reaches the ring 28. If at that instant amplifier 30, connected to ring 28, indicates that corona persists, it is indicative that the indication from amplifier 30 is truly of a corona.

In the apparatus illustrated a magnetic drum 36 is employed to record and interpret the output of the two amplifiers 30 and 34 of the pick-up rings 28 and 32, respectively. The drum 36 need not be physically a drum, as it could be a disc or an endless belt of the material used in tape recorders. The drum 36 is arranged to travel at a speed in constant ratio to the speed of the cable 10, which moves in contact with a pulley attached to the shaft of a synchronous generator 38, the output of which is employed to drive a synchronous motor 40, mechanically connected to the drum 36.

The output of the amplifier 34 for the pick-up ring 32 is utilized to record on the drum 36 through the recording head 44 or to cause operation of a pulse generator 42, the generated pulses of which are recorded on the drum 36 through the recording head 44. This record has been indicated in the drawing as a small black rectangle 46. It will be understood, therefore, that a series of records, such as 46, will appear on the drum 36, one for each corona occurring within the ring 32, and also one for each spurious signal put out by the amplifier 34 in response to interference, should there be any.

The output of the amplifier 30 for pick-up ring 28 is utilized to preserve the record 46 if corona exists when the point of the cable corresponding to the record reaches point A. If no corona exists at point A, either because of the voltage stress at this point is too low or because record 46 is spurious, viz., caused by interference, which, it will be understood, is only momentary, the record is to be erased. This is readily done by supplying an erase head 48, properly spaced from the recording head 44. This erase head normally erases everything which comes to it, except when the amplifier 30 is activated by corona existing within the ring 28 or by a second spurious signal. A switch circuit 50 de-activates the erase head 48 whenever the output of the amplifier 30 is indicative of corona.

Those records 46 which are preserved on the drum 36 then pass to a reading head 52, the output of which, amplified by amplifier 54, operates a suitable marker 56 to make a physical indication on the surface of the cable insulation at the location of a fault in which corona persisted while the fault was at point A. This marker can take any convenient form, as a spray gun, for example, and the physical indication or mark can be directly over the fault or at any predetermined distance therefrom.

An erase head 58 removes all records from the drum 36 after these records have activated the reading head 52 and the marker 56.

From the above it can be seen that all records produced by the head 44 are erased, whether indicative of corona or spurious, unless a signal occurs in amplifier 30 at exactly the right time to be very probably a result of corona. Spurious signals from amplifier 30 do no harm unless a record 46 is in exactly the right position opposite the erase head at the time of their occurrence, which is unlikely.

It is obvious that, by employing a plurality of rings 28, spaced longitudinally of the tube 14, each for a different voltage, several corona tests for as many different voltages as there are pick-up rings can be run simultaneously. Record head 44 is then arranged to produce a multiplicity of records 46, one for each ring 38, on separate channels on record element or drum 36. The erase head 48 for the first-to-be-reached ring 28 is arranged to cover all of the records across the width of record element 36, the next all but one, and so on. Instead of a single multi-channel reading head, a series of single-channel heads may be employed, each channel of each head being connected to a separate marker.

In addition to furnishing information which could be termed a profile of the occlusions encountered, the multiplicity of successive readings, each depending upon the one before, would reduce to the vanishing point the probability of spurious indications appearing on the cable.

Inasmuch as certain types of cable to be tested are expensive to repair, or whenever it may be desired to install a cable in a location where it is difficult and expensive to repair it, it becomes necessary that, in testing such cables, every precaution be taken to preclude suprious indications of corona-producing occlusions. The apparatus I have described has inherent interference suppression, since a spurious signal must appear in proper sequence and repeat at exactly spaced intervals to be confused with corona, and, as above pointed out, the number of pick-up rings may be increased, thereby enhancing selectivity.

It will be seen from all of the foregoing that I have provided apparatus for the corona-testing of the insulation of electric cables whereby any deleterious gas occlusions in the insulation may be detected and their position within the insulation accurately determined, thereby facilitating repairing of the cable if that be necessary.

It is to be understood that changes may be made in the details of construction and arrangement of parts above described within the purview of my invention.

What I claim is:

1. Apparatus for the corona-testing of insulated electric wire and cable, said apparatus comprising, in combination, a tube of insulating material containing a semiconducting fluid; means for advancing the insulated wire or cable, with its conductor grounded, through the tube; an electrode within the tube; a high-voltage source electrically connected to said electrode whereby, as the wire or cable advances through said tube, the insulation of the wire or cable will be electrically stressed progressively; a pick-up ring about said tube between said electrode and the exit end of the tube; an amplifier for said ring; a pulse generator connected to the output of said amplifier; a recording head connected to said generator; a magnetic recording device upon which the recording head records the presence of an occlusion in the insulation, which occlusion becomes ionized as it moves into said pick-up ring; means for moving said recording device at a speed in constant ratio to the speed of the wire or cable; a second pick-up ring about said tube positioned at a point where the stress on the insulation is lower than that at the first ring; and an erase head operatively connected to the said second ring for erasing the record on said recording device when the said occlusion reaches the said second ring should no corona occur at that instant at the occlusion.

2. Apparatus for the corona-testing of insulated electric wire and cable, said apparatus comprising, in combination, a tube of insulating material containing a semiconducting fluid; means for advancing the insulated wire or cable, with its conductor grounded, through the tube; an electrode within the tube; a high-voltage source electrically connected to said electrode whereby, as the wire or cable advances through said tube, the insulation of the wire or cable will be electrically stressed progressively; a pick-up ring about said tube between said electrode and the exit end of the tube; an amplifier for said ring; a pulse generator connected to the output of said amplifier; a recording head connected to said generator; a magnetic recording device upon which the recording head records the presence of an ionizable occlusion in the insulation as the occlusion moves into said pick-up ring; means for moving said recording device at a speed in constant ratio to the speed of the wire or cable; a second pick-up ring about said tube positioned intermediate the first ring and the exit end of said tube at a point where the stress on the insulation is lower than at the first ring; an erase head connected to the said second ring and operative to erase records of occlusions which are not deleterious when such occlusions reach said second ring, said erase head otherwise being inoperative; and a marker activated by a record which has passed the erase head without being erased, for applying a marking to the insulation at the site of the occlusion.

3. Apparatus for the corona-testing of insulated electric wire and cable, said apparatus comprising, in combination, means for progressively electrically stressing the insulation to be tested to ionize any deleterious gas occlusion in the insulation and cause corona to be formed thereat; a marker activated by the corona burst for applying a marking to the insulation at any predetermined point relative to the site of the occlusion, including the site of the occlusion; and means for avoiding activation of the marker by spurious corona bursts.

4. A device for detecting corona-producing voids in the insulation of an electric cable comprising means for moving the cable longitudinally through an apparatus, means for progressively electrically stressing the insulation in a manner conducive to the formation of corona in the voids; a plurality of corona-detecting devices progressively responsive to corona in a void as the cable moves through the apparatus; and corona-indicating means operated by the said corona-detecting devices only when at least one of the said corona-detecting devices in addition to the last of said detecting devices responds to corona at the same longitudinal position within the cable.

5. A device for detecting corona-producing voids in the insulation of an electric cable comprising means for progressively electrically stressing the insulation in a manner to induce corona in voids in the insulation; a plurality of corona-detecting devices spaced along the length of the cable; means for moving the cable longitudinally past said corona-detecting devices; and means interconnecting said corona-detecting devices, including means, operative upon elapse of time for a given point on the cable insulation corresponding to the site of a corona-producing void in the insulation to travel from one corona-detecting device to another, to cancel a corona indication from the first of said two corona-detecting devices unless corona exists at the second of said two corona-detecting devices on arrival of the said given point on the cable insulation at the said second of said two corona-detecting device.

6. A device for detecting corona-producing voids in the insulation of an electric cable comprising means for moving the cable longitudinally; means for progressively stressing the cable in a manner to create corona in the voids in the insulation; corona-detecting means responsive to corona in a short length of the cable operative to record the position of corona detected by it; a second corona-detecting means responsive to corona in a short length of the cable operative to erase the record when the portion of the cable corresponding to the record reaches the second corona-detecting means if no corona is detected by it; and reading means indicating the non-erasure of the record.

7. A device for detecting corona-producing voids in the insulation of electric cable comprising an insulated trough containing a semi-conducting liquid, said trough having grounded ends, and an electrode at high potential intermediate the ends of the trough; means grounding the conductor of the cable; means moving the cable through the trough; a pair of corona-detecting means spaced along the length of the trough, each responsive to corona in its immediate vicinity; a traveling record-receiving medium; means moving said record-receiving medium in synchronism with the movement of the cable; means connected to one corona-detecting means operative in response to corona in its immediate vicinity to make a record on the record-receiving medium; means connected to the second corona-detecting means normally erasing such record except upon operation of the second corona-detecting means; and reading means in the path of travel of the record-receiving medium responsive to the presence of an unerased record to indicate the presence of a corona-producing void.

8. A device for detecting corona-producing voids in the insulation of electric cable comprising an insulated trough containing a semi-conducting liquid, said trough having grounded ends, and an electrode at high potential intermediate the ends of the trough; means grounding the conductor of the cable; means moving the cable through the trough; a pair of corona-detecting means spaced along the length of the trough, each responsive to corona in its immediate vicinity; a traveling record-receiving medium; means moving said record-receiving medium in synchronism with the movement of the cable; means connected to one corona-detecting means operative in response to corona in its immediate vicinity to make a record on the record-receiving medium; means connected to the second corona-detecting means normally erasing such record except upon operation of the second corona-detecting means; reading means in the path of travel of the record-receiving medium responsive to the presence of an unerased record; and cable-marking means operated by response of the reading means.

9. Apparatus for detecting corona-producing voids in the insulation of a traveling electric wire or cable, said apparatus comprising, in combination, means for electrically stressing the insulation to ionize any deleterious gas occlusion in a void in the insulation and cause corona to be formed thereat, said means comprising an electrode connected to a high-voltage source and means for moving the insulated wire or cable relatively to said electrode whereby the stress level on the insulation is progressively varied; a plurality of corona-detecting devices spaced along the path of travel of the wire or cable, each responsive to corona in its immediate vicinity; and void-indicating means operated by said corona-detecting devices for indicating a void only if the void has caused response of more than one of said corona-detecting devices.

References Cited in the file of this patent

UNITED STATES PATENTS

| | | |
|---|---|---|
| 2,087,783 | Savage | July 20, 1937 |
| 2,103,134 | Akahira | Dec. 21, 1937 |
| 2,456,704 | Henning | Dec. 21, 1948 |
| 2,494,029 | Bertalan et al. | Jan. 10, 1950 |
| 2,701,336 | Anderson | Feb. 1, 1955 |
| 2,794,168 | Gooding | May 28, 1957 |
| 2,809,348 | Kellogg et al. | Oct. 8, 1957 |

FOREIGN PATENTS

| | | |
|---|---|---|
| 734,557 | Great Britain | Aug. 3, 1955 |